United States Patent
Kurozuka

(10) Patent No.: US 8,373,690 B2
(45) Date of Patent: Feb. 12, 2013

(54) SCANNING IMAGE DISPLAY APPARATUS

(75) Inventor: Akira Kurozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 234 days.

(21) Appl. No.: 12/808,462

(22) PCT Filed: Sep. 30, 2009

(86) PCT No.: PCT/JP2009/005028
§ 371 (c)(1),
(2), (4) Date: Jun. 16, 2010

(87) PCT Pub. No.: WO2010/044205
PCT Pub. Date: Apr. 22, 2010

(65) Prior Publication Data
US 2011/0122101 A1 May 26, 2011

(30) Foreign Application Priority Data

Oct. 17, 2008 (JP) ................................. 2008-268287

(51) Int. Cl.
*G09G 5/00* (2006.01)
(52) U.S. Cl. .................. 345/204; 359/201.2; 359/214.1
(58) Field of Classification Search ................ 345/204, 345/108–111; 359/201.1, 201.2, 214.1
See application file for complete search history.

(56) References Cited

U.S. PATENT DOCUMENTS

| | | | |
|---|---|---|---|
| 5,247,384 A * | 9/1993 | Inoue et al. ................ 359/199.1 |
| 5,557,449 A * | 9/1996 | Miyagawa et al. ......... 359/212.1 |
| 7,471,306 B2 | 12/2008 | Nakajima |
| 7,492,495 B2 | 2/2009 | Ishihara et al. |
| 7,630,112 B2 * | 12/2009 | Mizumoto ................. 359/199.1 |
| 2001/0036000 A1 * | 11/2001 | Nishikawa et al. .......... 359/212 |
| 2006/0028533 A1 | 2/2006 | Nakajima |
| 2007/0171497 A1 | 7/2007 | Ishihara et al. |
| 2008/0158632 A1 * | 7/2008 | Yamazaki .................... 359/202 |
| 2008/0239252 A1 | 10/2008 | Konno et al. |
| 2009/0046259 A1 * | 2/2009 | Lach et al. ...................... 353/94 |
| 2009/0316243 A1 | 12/2009 | Tsuida |

FOREIGN PATENT DOCUMENTS

| | | |
|---|---|---|
| JP | 10-301055 | 11/1998 |
| JP | 2004-53943 | 2/2004 |
| JP | 2004-517351 | 6/2004 |
| JP | 2006-72292 | 3/2006 |
| JP | 2006-133643 | 5/2006 |
| JP | 2007-199251 | 8/2007 |
| JP | 2008-249797 | 10/2008 |
| WO | 2008/032485 | 3/2008 |

OTHER PUBLICATIONS

International Search Report issued Nov. 10, 2009 in International (PCT) Application No. PCT/JP2009/005028.

* cited by examiner

*Primary Examiner* — Stephen Sherman
(74) *Attorney, Agent, or Firm* — Wenderoth, Lind & Ponack, L.L.P.

(57) ABSTRACT

A scanning image display apparatus includes a light source section that emits a laser beam, a scan mirror that scans the laser beam two-dimensionally in a first direction and a second direction which intersects the first direction, and a control section that drives the scan mirror. Herein, the control section drives the scan mirror such that a scan frequency in the first direction becomes higher than a scan frequency in the second direction, and changes the scan frequency in the first direction in synchronization with a period of the scan frequency in the second direction to change a scan amplitude in the first direction.

4 Claims, 8 Drawing Sheets

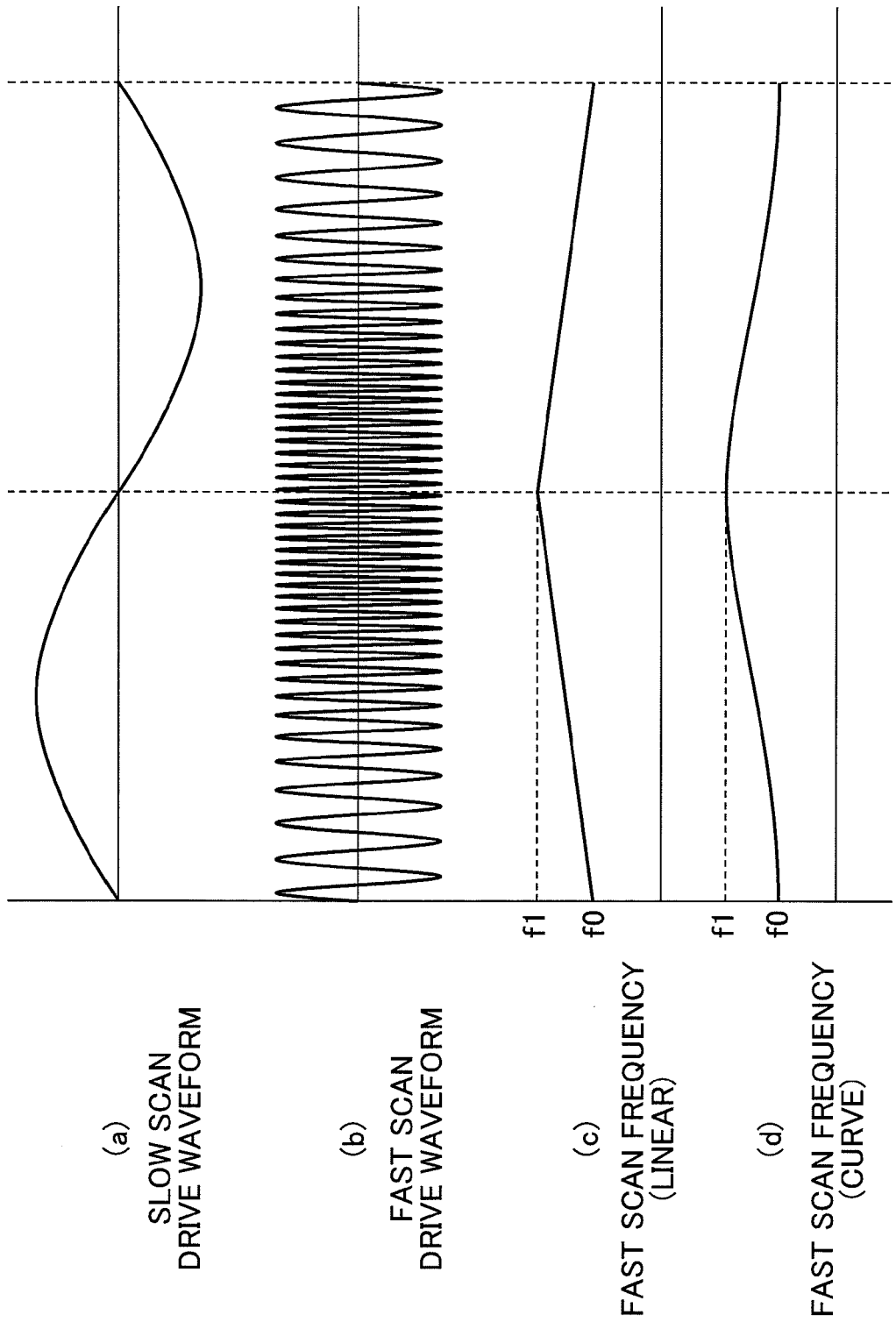

SCANNING IMAGE DISPLAY APPARATUS

TECHNICAL FIELD

The present invention relates to a scanning image display apparatus, such as an HMD (Head Mount Display), in which a scan mirror is used for scanning a laser beam.

BACKGROUND ART

For image display apparatuses such as an HMD (Head Mount Display) which is mounted on a head of a user in order to display an image, conventionally, there have been proposed various schemes such as a scheme of employing a pixel type display device such as a liquid crystal element or an organic EL to be used as an image display section, and a scheme of scanning a laser beam in a two-dimensional manner to directly depict an image on a retina of an eye.

Such image display apparatus needs to be small in size and light in weight so that a user can use the image display apparatus for a long period of time while reducing a burden to be imposed on the user when the image display apparatus is mounted on the user. Furthermore, such image display apparatus is designed like a typical eyewear, so that a user can do anything while constantly putting on this image display apparatus just like a typical eyewear.

According to the scheme of employing the pixel type display device, however, an eyepiece optical system including a display section, a prism that guides light emitted from the display section to an eye, and a half mirror is increased in size in order to realize higher image quality and a wider angle of view. Consequently, it is difficult to realize size reduction and weight reduction with regard to the image display apparatus.

Moreover, the large eyepiece optical system described above is mounted on the user so as to cover his/her eyes, and therefore has a shape like a goggle or a helmet rather than an eyewear. Consequently, it is not possible to attain a feeling of natural mounting, and therefore it is difficult to realize an image display apparatus like a typical eyewear.

On the other hand, a retina scanning image display apparatus that employs a laser scan scheme includes a small MEMS (Micro-Electro-Mechanical-System) mirror device. This structure brings about an advantage in that the image display apparatus can be significantly reduced in size.

Further, there has also been proposed a different retina scanning image display apparatus that employs the laser scan scheme. This image display apparatus includes a hologram mirror in place of a prism and a half mirror. According to this structure, an eyepiece optical system is reduced in size, so that this image display apparatus can be formed in an eyewear type (see, for example, Patent Document 1).

FIGS. 8A through 8C each illustrate one example of a structure of the image display apparatus that employs the laser scan scheme. Specifically, FIG. 8A shows a plan view of the image display apparatus that employs the laser scan scheme. FIG. 8B shows a side view of the image display apparatus that employs the laser scan scheme. FIG. 8C shows the image display apparatus that employs the laser scan scheme when the image display apparatus is seen from an eye side.

FIGS. 8A through 8C each illustrate only a right side with regard to a head portion of a user and the scanning image display apparatus. In a case of a both-eyes type, this apparatus has a laterally symmetric structure.

The scanning image display apparatus shown in FIGS. 8A through 8C has the following structure. That is, a temple 11 is equipped with a light source section 1 that emits a laser beam 2, a scan mirror 3 that scans the laser beam 2 in a two dimensional manner, and a control section 14 that controls these members.

The scanning image display apparatus also includes an eyewear lens 12, and a hologram mirror 13 that is formed on a surface of the eyewear lens 12. The laser beam 2 is projected by the scan mirror 3 onto the eyewear lens 12, is reflected by the hologram mirror 13, and then enters an eye 17 of the user. Thus, an image is formed on a retina of the eye 17. For example, the hologram mirror 13 includes a photopolymer layer having a Lippmann volume hologram formed thereon. The hologram mirror 13 has such a wavelength selectivity to reflect only a wavelength of a laser beam. As a result, the user can visually recognize both outside scenery and an image depicted by the laser beam at the same time.

According to the foregoing conventional structure, the hologram mirror 13 is irradiated with the laser beam 2 from the scan mirror 3 without such a situation that the laser beam 2 is shielded by a user's face. Thus, the laser beam 2 is obliquely projected onto the eyewear lens 12 at an incident angle α. Consequently, there arises a problem that an image to be projected onto the hologram mirror 13 becomes distorted in a trapezoid shape, like an oblique projection region 8 shown in FIG. 8C.

Typically, when a rectangular image is projected from an oblique position onto a projection plane, a scan beam is expanded at a side distant from a scan center, so that the resultant projection region has a trapezoid shape in which a side close to the scan center is narrow whereas a side distant from the scan center is wide. For this reason, when light reflected by the hologram mirror 13 enters the eye 17 to reach the retina, an image to be recognized by the user becomes distorted in a trapezoid shape.

Normally, a front projector or the like performs image processing on an image to correct such a trapezoid distortion. Herein, a rectangular display region is determined based on a length of shorter one of an up side and a bottom side in a trapezoid shape, and an image is not displayed on a portion protruding from the rectangular region (hereinafter, referred to as an invalid scan region). Thus, a user can recognize a rectangular image like a display region 9 (see FIG. 8C).

According to this method, however, the image is displayed in a downsized manner at a side where the projection region becomes widened, so that a displayable resolution is lowered. Moreover, as the invalid region is larger, a period of time that an image can be displayed within one frame becomes short, and the image becomes darkened. In order to maintain the brightness of the image, an output from the light source needs to be raised, which results in an increase in the power consumption.

In order to solve the foregoing problem, there has been proposed a method of controlling a drive amplitude and a drive speed of a scan mirror to correct a shape of a scan region and a scan line pitch (see, for example, Patent Document 2).

In this method, an MEMS mirror quickly performs a scan operation in a first direction (a fast scan direction) whereas a vertical deflector (a so-called galvanometer mirror) which can be driven at a free waveform slowly performs a scan operation in a second direction (a slow scan direction). Then, a deflection amplitude of the MEMS mirror is changed. This change offsets widening of a scan width in a case of oblique projection. Further, this change allows control of a deflection speed of the galvanometer mirror, and also allows correction of widening of the scan line pitch.

However, the described conventional structure also has the following problems.

Herein, the deflection amplitude of the MEMS mirror is changed in accordance with the scan operation in the slow scan direction. Therefore, a drive voltage on a side where the amplitude is suppressed is lowered or a distance between a coil and a permanent magnet in a MEMS mirror drive section is increased. As a result, a drive force for the MEMS mirror is weakened and the deflection amplitude is decreased. In the MEMS mirror which is vibrated while being resonated, particularly, the vibration is maintained at a certain level by inertial motion, so that the change in the amplitude does not necessarily follow a change in a drive signal.

Further, the slow scan operation is performed only in one direction. This structure makes it more difficult that a change in the amplitude of the MEMS mirror follows a fast vertical feedback.

For the correction of the scan line pitch, the galvanometer mirror which can be driven at a free waveform is used for performing the slow scan operation. In order to drive the galvanometer mirror, an actuator needs to be provided to generate a satisfactory drive force in an entire angular displacement. This actuator hinders the size reduction of the image display apparatus.

On the other hand, the resonance mirror can achieve a large displacement with a small drive force. Therefore, use of the resonance mirror is suitable for the size reduction of the image display apparatus. However, a vibration waveform is in a sine wave shape, so that the resonance mirror cannot be driven at a free waveform.

In the eyewear type HMD described above, that is, in an image display apparatus that requires a very small structure, a biaxial resonant MEMS mirror is suitably employed because this MEMS mirror can perform a biaxial scan operation in one chip. Because of the reasons described above, however, the MEMS mirror cannot be driven so as to correct the shape of the scan region and the scan line pitch.

PRIOR ART DOCUMENTS

Patent Documents

Patent Document 1: Japanese Unexamined Patent Publication No. Hei 10-301055
Patent Document 2: Japanese Unexamined Patent Publication No. 2007-199251

SUMMARY OF THE INVENTION

An object of the present invention is to provide a scanning image display apparatus that allows realization of favorable image display even in a case of oblique projection.

In order to achieve the foregoing object, a scanning image display apparatus according to one aspect of the present invention includes a light source section that emits a laser beam, a scan mirror that scans the laser beam two-dimensionally in a first direction and a second direction which intersects the first direction, and a control section that drives the scan mirror, wherein the control section drives the scan mirror such that a scan frequency in the first direction becomes higher than a scan frequency in the second direction, and changes the scan frequency in the first direction in synchronization with a period of the scan frequency in the second direction to change a scan amplitude in the first direction.

According to the foregoing structure, the control section that drives the scan mirror changes the scan frequency in the first direction in synchronization with the period of the scan frequency in the second direction to change the scan amplitude in the first direction. With a change in the scan frequency, it is possible to readily adjust the scan amplitude and to set a scan region in a shape as desired. It is therefore possible to display a high-quality image even in a case of oblique projection.

Other objects, characteristics and superior matters of the present invention will be sufficiently understood from the following detailed description. Moreover, advantages of the present invention will be clarified by the following description with reference to the appended drawings.

BRIEF DESCRIPTION OF THE DRAWINGS

FIG. 9 shows a waveform chart of a relation between a slow scan drive waveform and a fast scan drive waveform.

EMBODIMENTS OF THE INVENTION

Hereinafter, preferred embodiments of the present invention will be described with reference to the drawings. It should be noted that each of the following preferred embodiments is merely one example for embodying the present invention, and therefore does not intend to limit the technical scope of the present invention.

First Embodiment

One embodiment of the present invention will be described herein below with reference to the drawings.

First, a layout of constituent members and a shape of a scan pattern are described with regard to a scanning image display apparatus according to the present embodiment.

Figure 1:
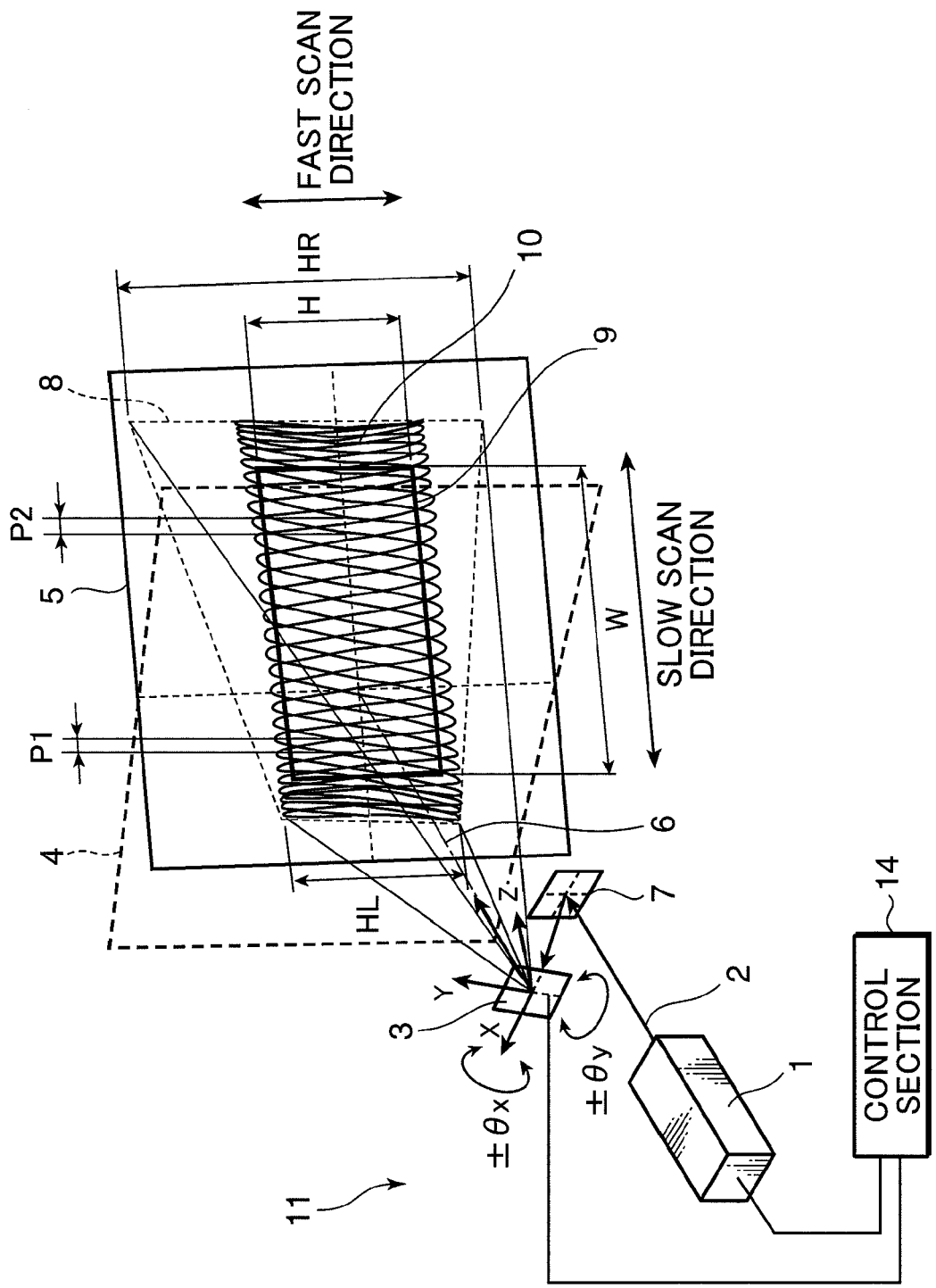
FIG. 1 is an explanatory view showing a schematic structure of a scanning image display apparatus according to one embodiment of the present invention.
Figure 2:
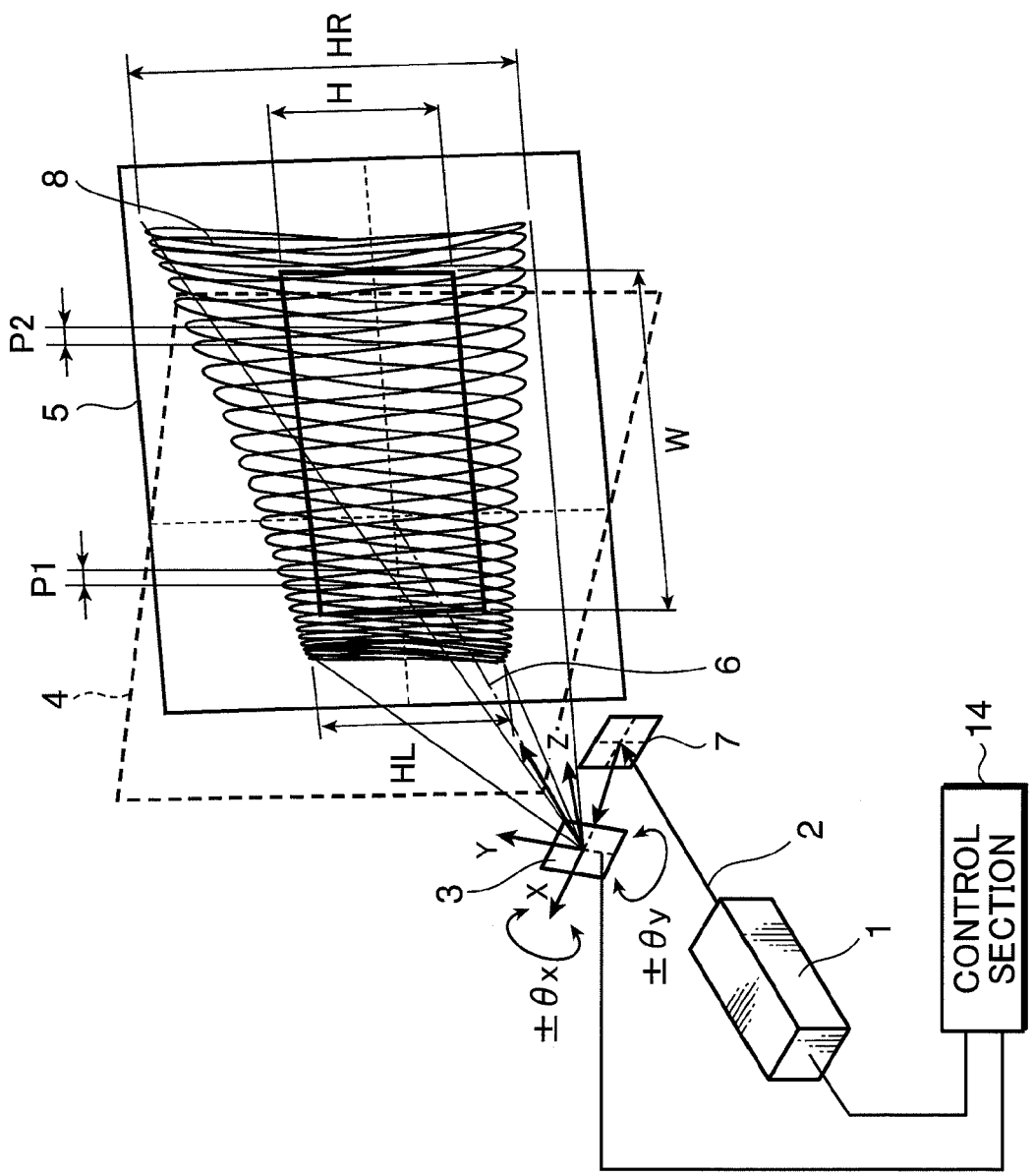
FIG. 2 is an explanatory view showing a schematic structure of the scanning image display apparatus according to the embodiment of the present invention.
Figure 3:
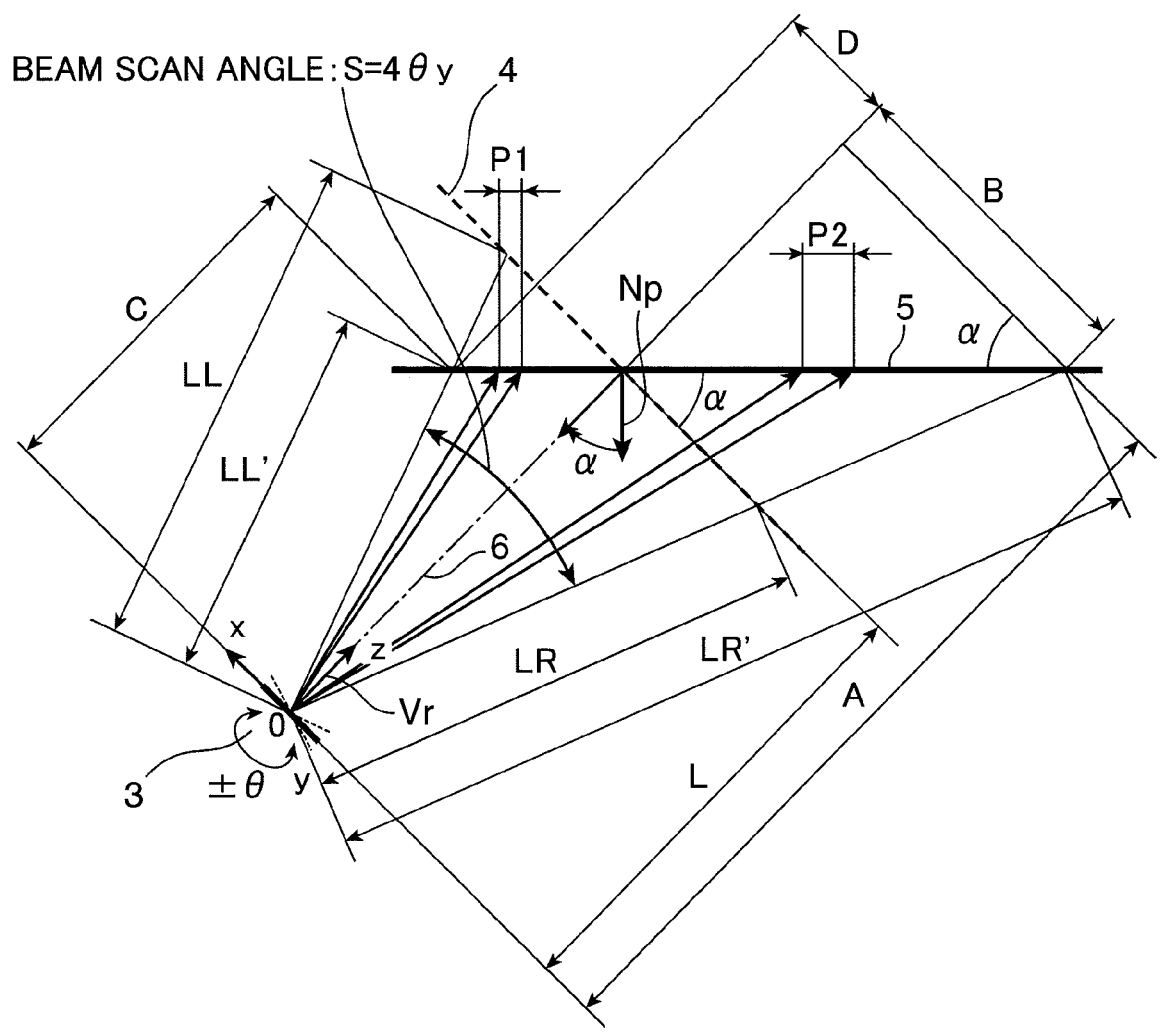
FIG. 3 is an explanatory view showing a layout regarding a scan mirror and a projection plane.

FIGS. 1 through 3 each illustrate a schematic structure of the scanning image display apparatus according to the present embodiment. FIG. 1 shows a perspective view of a scan track drawn by a driving method according to the present embodiment. FIG. 2 shows a perspective view of a scan track drawn when a conventional driving method is applied to a scanning image display apparatus which is similar in structure to that shown in FIG. 1. FIG. 3 shows a plan view of a layout regarding a scan mirror and a projection plane in the scanning image display apparatus shown in FIG. 1.

As shown in FIG. 1, a scanning image display apparatus 11 according to the present embodiment includes a light source section 1, a scan mirror 3 (scanning means), a folding mirror 7, and a control section (a focus control section, an intensity control section) 14.

Figure 8A:
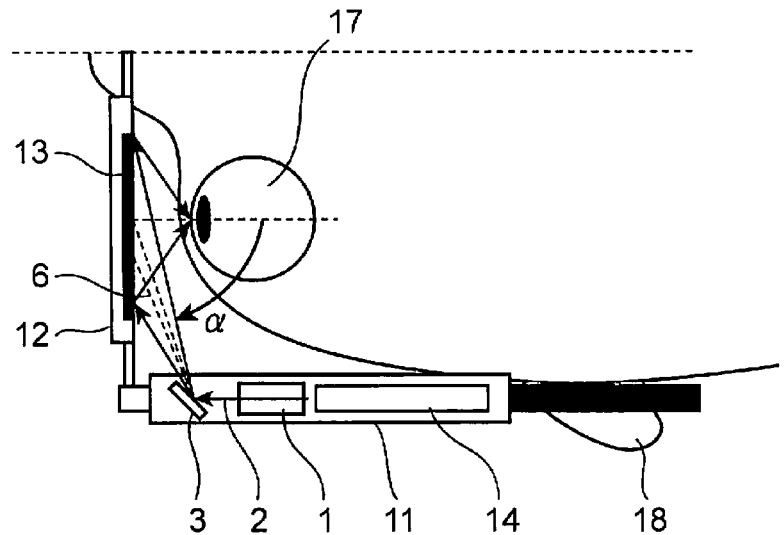
FIG. 8A shows a plan view of main sections in a conventional scanning image display apparatus.

The light source section 1 includes a laser light source, a collimator lens, a condenser lens and the like (these constituent elements are not shown in the figures). A laser beam 2 is emitted from the light source 1, is reflected by the folding mirror 7, and enters the scan mirror 3. Then, the laser beam 2 is reflected by the scan mirror 3 while being deflected, and is projected onto an oblique projection plane 5. For example, for the scanning image display apparatus of the eyewear type as shown in FIG. 8A, a hologram mirror 13 formed on a surface of an eyewear lens 12 serves as the oblique projection plane 5. Alternatively, in the case where the scanning image display apparatus 11 is installed in a vehicle as will be described later, the oblique projection plane 5 may serve as a windshield of the vehicle. Moreover, in a case where the scanning image display apparatus 11 is used as a projector, a given screen or wall surface may serve as the oblique projection plane 5.

The control section 14 drives the scan mirror 3, and controls an intensity of the laser beam 2 emitted from the light source section 1. For example, the control section 14 may be configured with a CPU (Central Processing Unit), a ROM (Read Only Memory) for storing a program, a RAM (Random Access Memory) for storing a program and data upon execution of various processes, an I/O interface, and a bus for connecting among these elements (these constituent elements are not shown in the figures).

The scan mirror 3 is a biaxial resonance mirror which is driven while being resonated in two directions, that is, a horizontal direction (a second direction) and a vertical direction (a first direction), and has such a structure that a scan beam travels in a Lissajous's pattern. The control section 14 calculates an address of a pixel in an image to be displayed, from a deflection direction of the laser beam derived from a drive signal generated by the scan mirror 3. Based on this pixel data, the control section 14 modulates the intensity of the laser beam 2 emitted from the light source section 1. The control section 14 modulates the intensity of the laser beam 2 to allow display of a desired image.

Figure 4:
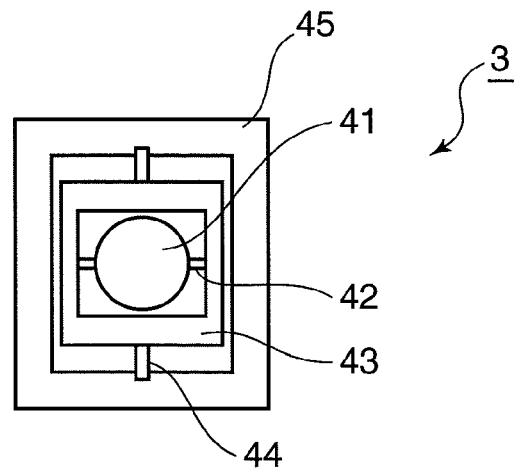
FIG. 4 shows a plan view of a schematic structure of the scan mirror.

Typically, the scan mirror 3 is an MEMS device having a structure shown in FIG. 4. A mirror section 41 is held by a support section 42 so as to be rotatable with respect to an intermediate frame 43. The intermediate frame 43 is held by a support section 44 so as to be rotatable with respect to a fixed frame 45. In order to drive the scan mirror 3, there have been employed a piezoelectric device, an electrostatic device, an electromagnetic device and the like. With regard to the support section, moreover, there have been developed various structures in accordance with the driving schemes. Herein, the scan mirror according to the present embodiment is not limited to a specific structure and a specific driving scheme. In other words, various structures and driving schemes may be applied to the scan mirror according to the present embodiment.

Moreover, the scan mirror 3 is driven while being resonated, and therefore realizes size reduction. It is considered herein as to an electrostatically driven MEMS device in which comb electrodes are formed between a mirror section 41 and an intermediate frame 43 and between the intermediate frame 43 and a fixed frame 45. This MEMS device, which is now developed, has a size of 10 mm×10 mm and resonance frequencies within a range of 10 kHz through 20 kHz and a range of 200 Hz through 2 kHz. Moreover, it is considered as to a piezoelectrically driven MEMS device in which a piezoelectric film is formed on a support section to resonate a movable section. This MEMS device, which is now developed, also has a size and resonance frequencies which are almost equal to those described above. As described above, it is desirable that the scan mirror 3 is driven while being resonated. In the present embodiment, the scan mirror 3 is not necessarily driven under the resonance condition, and may be driven out of the resonance condition.

In FIGS. 1 through 3, as a coordinate system, a center of rotation of the scan mirror 3 is defined as an origin. Moreover, an X axis extends in the horizontal direction, a Y axis extends in the vertical direction, and a Z axis extends in a normal direction. (In view of the layout, the back side of the scan mirror 3 is shown in the figures.)

A vertical projection plane 4 corresponds to a plane which is vertical to an axis of reflected light when the scan mirror 3 is in a neutral position, that is, a scan center axis 6, and is shown by a broken line in the figures. The oblique projection plane 5 corresponds to the vertical projection plane 4 which is turned by an angle α about a plumb line passing the scan center axis 6. That is, an incident angle of the laser beam 2 onto the oblique projection plane 5 is α.

The scan mirror 3 is driven to rotate about the X axis by an amount of ±θx, and also is driven to rotate about the Y axis by an amount of ±θy. The laser beam 2, which is scanned two-dimensionally by the scan mirror 3, travels over the oblique projection plane 5, so that an oblique scan track 8 is drawn.

In FIG. 3, LL denotes a distance between the center of rotation of the scan mirror 3 (the origin) and a left end of a projection region on the vertical projection plane 4, and LL' denotes a distance between the origin and a left end of a projection region on the oblique projection plane 5. Moreover, LR denotes a distance between the origin and a right end of the projection region on the vertical projection plane 4, and LR' denotes a distance between the origin and a right end of the projection region on the oblique projection plane 5. As shown in FIG. 3, when the oblique projection plane 5 is turned by the angle α in a counterclockwise direction with respect to the vertical projection plane 4, the distance between the origin and the left end of the projection region becomes LL' which is shorter than LL whereas the distance between the origin and the right end of the projection region becomes LR' which is longer than the LR. Accordingly, as the projection distance is long, the projection region on the right end becomes widened as compared with the projection region on the left side.

In FIG. 3, the following equations are established with respect to a length A and a length B.

$$B/A = \tan 2\theta y \quad \text{Equation (1)}$$

$$(A-L)/B = \tan \alpha \quad \text{Equation (2)}$$

Therefore, the following equation is established.

$$L/A = 1 - \tan 2\theta y \tan \alpha = LR/LR' \quad \text{Equation (3)}$$

In FIG. 3, likewise, the following equations are established with respect to a length C and a length D.

$$D/C = \tan 2\theta y \quad \text{Equation (4)}$$

$$(L-C)/D = \tan \alpha \quad \text{Equation (5)}$$

Therefore, the following equation is established.

$$L/C = 1 + \tan 2\theta y \tan \alpha = LL/LL' \quad \text{Equation (6)}$$

Thus, the following equation is established with respect to a ratio between the left and right projection distances of the projection region on the oblique projection plane 5 (LR'/LL').

$$LR'/LL' = (1+\tan 2\theta y \tan \alpha)/(1-\tan 2\theta y \tan \alpha) \quad \text{Equation (7)}$$

In FIG. 2, HL denotes a height of the left end of the projection region on the oblique projection plane 5 (a distance in the vertical direction), and HR denotes a height of the right end of the projection region on the oblique projection plane 5. Herein, this height is proportional to the projection distance in the left and right ends of the projection region. Therefore, the following equation is established with respect to a ratio between the left and right heights of the projection region on the oblique projection plane 5 (HR/HL).

$$HR/HL = (1+\tan 2\theta y \tan \alpha)/(1-\tan 2\theta y \tan \alpha) \quad \text{Equation (8)}$$

As shown in FIG. 2, accordingly, the projection region (an oblique projection region 8) to be projected onto the oblique projection plane 5 has a contour which is a trapezoidal shape in which the distance in the vertical direction gradually becomes long from the left end to the right end in the projection region. Moreover, a scan track on the projection region is drawn as an oblique scan track 8'.

In the oblique projection plane 5, moreover, the laser beam is projected in not only the vertical direction but also the horizontal direction in an enlarged manner. Therefore, a pitch regarding the scan track 8' in the horizontal direction (a slow scan direction) is also enlarged from the left end to the right end in the projection region.

As shown in FIG. 3, at positions which are symmetrical with respect to the scan center axis 6, deflection speeds of the scan mirror 3 are equal to each other; however, the projection distance becomes long as the position is shifted rightward. In an image, therefore, a scan pitch P2 on the right side is wider than a scan pitch P1 on the left side. Herein, the scan pitch refers to a pitch regarding a scan line in a slow scan direction (a second direction), and this scan line is formed on a projection plane by a laser beam scanned in a fast scan direction (a first direction). Fundamentally, a laser beam is scanned in a Lissajous's pattern, and therefore a scan line has a sine wave form. The scan line is not formed linearly and, further, is not formed at a regular pitch. Herein, a displayable resolution is determined based on a portion where the scan pitch is widest. In Lissajous's display, since a scan pitch in a central portion of a scan region is widest, a scan frequency is set such that a displayable resolution is determined based on this scan pitch. Accordingly, when a scan pitch on a left side is different from that on a right side in an image, a displayable resolution in a horizontal direction is lowered at the right side of the image. In order to secure a horizontal resolution at the right side where the scan pitch is widened, a scan frequency needs to be raised.

As shown in FIG. 1, an image is displayed on a rectangular region having a height (a distance in the vertical direction) H and a width (a distance in the horizontal direction) W, such as a display region 9, in the structure described above. For this reason, the image can be displayed with a size thereof reduced in such a manner that the number of pixels in a row is reduced at the right side of the image. However, a vertical resolution is lowered disadvantageously.

In order to avoid this disadvantage, according to the present embodiment, a fast scan operation is performed by the scan mirror 3 in the vertical direction (the first direction), and also a slow scan operation is performed by the scan mirror 3 in the horizontal direction (the second direction). Moreover, a fast scan frequency in the vertical direction is modulated (changed) in synchronization with a period of a slow scan frequency in the horizontal direction. Thus, a scan amplitude in the vertical direction (the fast scan direction) is changed. A method for changing a fast scan frequency to adjust a scan amplitude in a fast scan direction is described herein below in detail.

Figure 5:
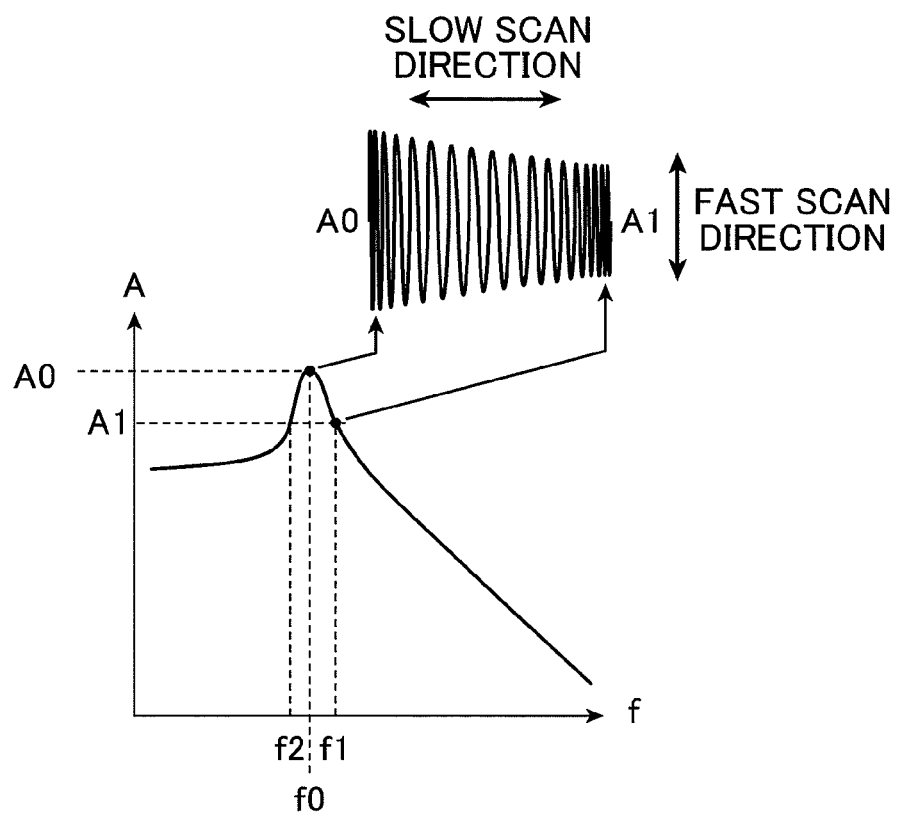
FIG. 5 shows a graph of a scan amplitude-to-scan frequency characteristic of the scan mirror.

FIG. 5 illustrates a scan amplitude-to-scan frequency characteristic of the scan mirror 3. Herein, the scan mirror 3 may be a single degree of freedom vibration system. In the scan mirror 3, a scan amplitude has a peak at a resonance frequency f0 expressed by the following equation.

$$f0 = (1/2\pi)\sqrt{(K/J)} \quad \text{Equation (9)}$$

In this equation, J represents an inertia of the movable section and K represents a rotating spring constant of the support section. The scan mirror 3 has a certain low-band gain when the scan frequency is equal to or less than f0. Moreover, the scan mirror 3 exhibits such a characteristic that the scan amplitude attenuates at −20 dB/decade (decade: 10 times) when the scan frequency is equal to or more than f0.

It is assumed herein that A0 represents a scan amplitude when the scan frequency of the scan mirror 3 is set to be equal to the resonance frequency f0 and A1 represents a scan amplitude when the scan frequency of the scan mirror 3 is set to f1 which is higher than the resonance frequency f0. When the fast scan frequency of the scan mirror 3 is gradually changed (raised) from f0 to f1, the scan amplitude in the fast scan direction is gradually changed (lowered) from A0 to A1. The fast scan frequency is modulated in synchronization with the slow scan frequency so as to be gradually raised to f0 at the left end of the scan region and to f1 at the right end of the scan region. Thus, the resultant scan region (projection region) has a trapezoid shape as shown in FIG. 5. The trapezoid scan region shown in FIG. 5 corresponds to a scan region on the vertical projection plane 4.

Herein, the ratio between the height of the right end and the height of the left end in the scan region on the vertical projection plane 4 (A0/A1) (this height corresponds to the scan amplitude in the fast scan direction) is set to be equal to the ratio between the height of the right end and the height of the left end in the scan region on the oblique projection plane 5 (HR/HL). Thus, the scan region in the case of oblique projection can be corrected so as to have a rectangular shape like a corrected scan region 10 shown in FIG. 1.

Occasionally, the scan amplitude in the case where the fast scan frequency is set to f1 is not sufficiently suppressed to A1 depending on the inertia of the movable section, the dumping coefficient of the support section and the slow scan frequency for modulating the scan amplitude in the fast scan direction with regard to the scan mirror 3. Typically, the change of the fast scan amplitude is hard to follow the slow scan frequency as the inertia of the movable section is high, the dumping coefficient of the support section is low and the slow scan frequency is high. In other words, it is not possible to increase a ratio of A0/A1.

In this case, the fast scan frequency is changed largely as compared with f1 read from the frequency characteristic in order to further enhance the amplitude modulation degree. Thus, the scan amplitude can be adjusted to be set to A1. This structure produces an effect of forcibly suppressing the movable section of the scan mirror 3 from inertial vibration because the amplitude is not suppressed by reduction of a driving force, but the timing of the drive signal is changed in a state in which the drive signal is applied to the scan mirror 3 at a certain level, unlike the case of modulating the voltage of the drive signal to be applied to the scan mirror.

The method according to the present embodiment wherein the fast scan frequency is changed to control the scan amplitude is advantageous over to the conventional method wherein the voltage of the drive signal to be applied to the scan mirror is modulated to control the scan amplitude in the following point. That is, it is possible to set the scan region in a shape as desired by controlling the scan amplitude under stable conditions even in the case where the inertia of the movable section is higher, the dumping coefficient of the support section is lower and the slow scan frequency is higher.

It is apparent from the graph shown in FIG. 5 that a scan frequency f2, at which the scan amplitude is A1, is lower than f0. Accordingly, even in the case where the fast scan frequency is modulated so as to be gradually lowered to f0 at the left end of the scan region and to f2 at the right end of the scan region, it is possible to set the height of the left end at A0 and to set the height of the right end at A1 in the scan region on the vertical projection plane 4 as in the case described above.

In this case, however, the vertical scan frequency is lowered, that is, the vertical scan speed is lowered in the direction of suppressing the scan amplitude in the vertical direction (the fast scan direction) to A1. Therefore, the pitch of the scan line in the horizontal direction (the slow scan direction) becomes widened.

In the case of oblique projection, as described above, the scan pitch in the horizontal direction is widened at the side where the scan amplitude is widened (i.e., the side to be driven in order to suppress the scan amplitude). Accordingly, when the scan frequency is further lowered at the side to be driven in order to suppress the scan amplitude, the number of scan lines per unit area is further reduced, resulting in degradation of the horizontal resolution. For this reason, it is desirable that the scan frequency is raised such that the scan pitch becomes narrower at the side where the scan amplitude is suppressed.

More specifically, in the case where the slow scan operation is performed in the direction that the projection distance becomes farther by the oblique projection, the fast scan frequency is raised from f0. On the other hand, in the case where the slow scan operation is performed in the direction that the projection distance becomes closer, the fast scan frequency is lowered to f0. Thus, the correction scan operation to be performed by the scan mirror which is driven while being resonated in order to offset the trapezoid distortion generated in the case of oblique projection allows the change of the scan amplitude of the laser beam and also allows suppression of the widening of the scan pitch in the slow scan direction. In other words, it is possible to suppress the difference between the scan pitch P1 on the left side and the scan pitch P2 on the right side with regard to the image shown in FIG. 1. Accordingly, it is possible to correct the uneven resolution in the scan region.

FIG. 9 shows a waveform chart of a relation between a slow scan drive waveform and a fast scan drive waveform. The slow scan drive waveform shown in (a) of FIG. 9 has one period corresponding to one reciprocating scan operation in the horizontal direction, that is, the leftward scan, the rightward scan and the leftward scan in the scan region shown in FIG. 5. In fact, a certain relation with regard to phase holds among the drive circuit, the drive signal for driving the scan mirror 3, the vibrations of the scan mirror 3. Herein, for ease in explanations, the drive signal phase and the vibrations of the scan mirror 3 are phase matched in the figure.

The fast scan drive waveform shown in (b) of FIG. 9 is modulated such that a scan frequency is set to f0 in the beginning of one period of the slow scan drive waveform, is changed to f1 after a lapse of a half period, and returns to f0 after a lapse of one period. That is, the frequency of the fast scan drive waveform is gradually changed in synchronization with the period of the slow scan drive waveform. Then, the slow scan drive waveform and the fast scan drive waveform are brought into synchronization with each other such that the fast scan frequency is raised in the scan region where the projection distance becomes long in the case of oblique projection.

With regard to the method for modulating the fast scan frequency, there is an advantage that the control is effected with ease when the fast scan frequency is changed in a linear form as shown in (c) of FIG. 9. Moreover, there is an advantage that the frequency is changed smoothly and the vibration of the scan mirror 3 is not disturbed so much when the fast scan frequency is changed in a curved form as shown in (d) of FIG. 9. Alternatively, the change of the scan amplitude can be controlled in a linear form when the fast scan frequency is changed in consideration of the curve form of the scan amplitude-to-scan frequency characteristic shown in FIG. 5. Thus, the side of the rectangular shape upon correction of the trapezoid distortion in the scan region can be made closer to a linear form.

When the fast scan frequency is modulated so as to be higher than f1, the scan pitch in the slow scan direction can be corrected in a wider range. By the over modulation of the fast scan frequency, when the suppression of the scan amplitude becomes excessive because of the frequency modulation, the scan amplitude may be controlled so as to be raised in such a manner that the drive voltage on the fast scan side is raised. As described above, by the appropriate combination of the frequency modulation with the voltage control with regard to the fast scan drive waveform, it is possible to enhance the degree of freedom about the correction of the trapezoid distortion in the scan region in the case of oblique projection and the degree of freedom about the correction of the scan pitch in the slow scan direction.

Moreover, focus control means for controlling the focus of the laser beam to be emitted onto the scan mirror 3 may be provided to control the beam spot diameter on the projection plane in accordance with the frequency modulation. Herein, it is desirable to appropriately control the beam spot diameter on the projection plane in accordance with the corrected scan pitch. For example, this laser beam focus control can be realized using an actuator that displaces the condenser lens of the light source section 1 in the light axis direction in addition to the control section 14 that controls the actuator. That is, the light source section 1 may include the laser light source, the collimator lens, the condenser lens, the actuator and the like (these elements are not shown in the figures), and the control section 14 may drive the actuator in accordance with the change of the fast scan frequency. More specifically, the control section 14 controls the position of the condenser lens on the light axis such that the beam spot diameter on the oblique projection plane 5 is relatively increased in the scan region where the scan pitch is relatively wide while the beam spot diameter on the oblique projection plane 5 is relatively decreased in the scan region where the scan pitch is relatively narrow. As a result, there is an advantage of preventing scan lines from overlapping in the entire screen and preventing the scan pitch from becoming widened excessively. In order to compensate the change of the brightness because of the change of the beam spot diameter on the oblique projection plane 5, the control section 14 may control the intensity of the laser beam while controlling the focus of the laser beam. In the case where the intensity of the laser beam is set to a fixed level, as the beam spot diameter on the oblique projection plane 5 becomes large, an amount of light per unit area is reduced in the oblique projection plane 5, so that the brightness is lowered. In order to avoid this disadvantage, the light source section is controlled such that the intensity of the laser beam is relatively raised in the scan region where the beam spot diameter on the oblique projection plane 5 is relatively increased whereas the intensity of the laser beam is relatively lowered in the scan region where the beam spot diameter is relatively decreased. This structure allows suppression of the uneven brightness in the scan region.

As described above, in the case where the projection plane is provided obliquely with respect to the scan center axis, the fast scan frequency of the scan mirror is appropriately modulated in order to suppress the trapezoid distortion corresponding to the shape of the scan region. Simultaneously, the scan pitch can be prevented from becoming widened. Thus, it is possible to realize favorable image display with reduced invalid region and with less deteriorated resolution.

Occasionally, the resonance frequency of the vibration system (the scan mirror 3) varies depending on temperature. Typically, as a temperature increases, a spring constant of a support system decreases due to thermal expansion, but an inertia of a movable section does not vary. Therefore, it is apparent from Equation (9) that a resonance frequency is lowered.

Figure 6A:
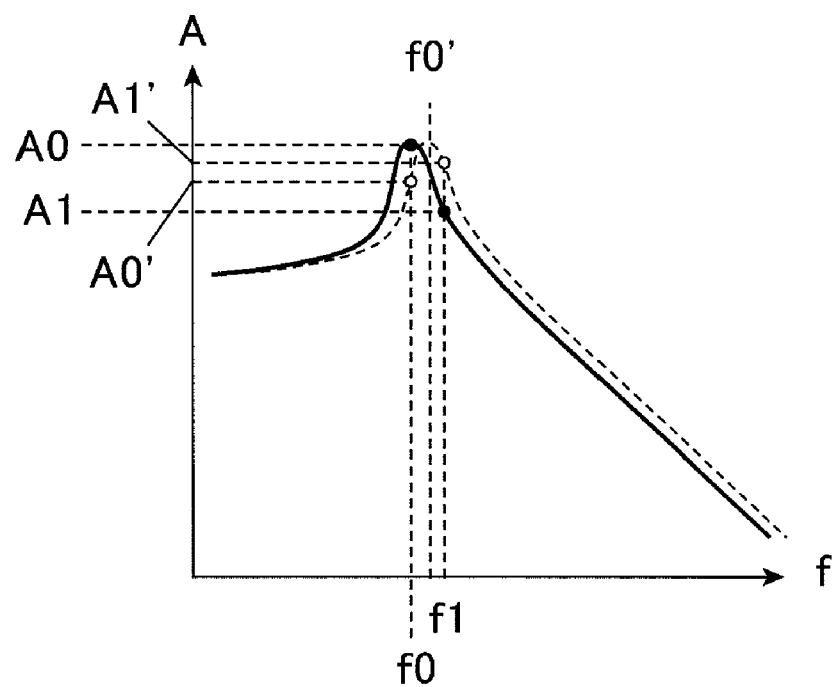
FIG. 6A shows a graph of the scan amplitude-to-scan frequency characteristic when a resonance frequency of the scan mirror is changed to a high frequency side.
Figure 6B:
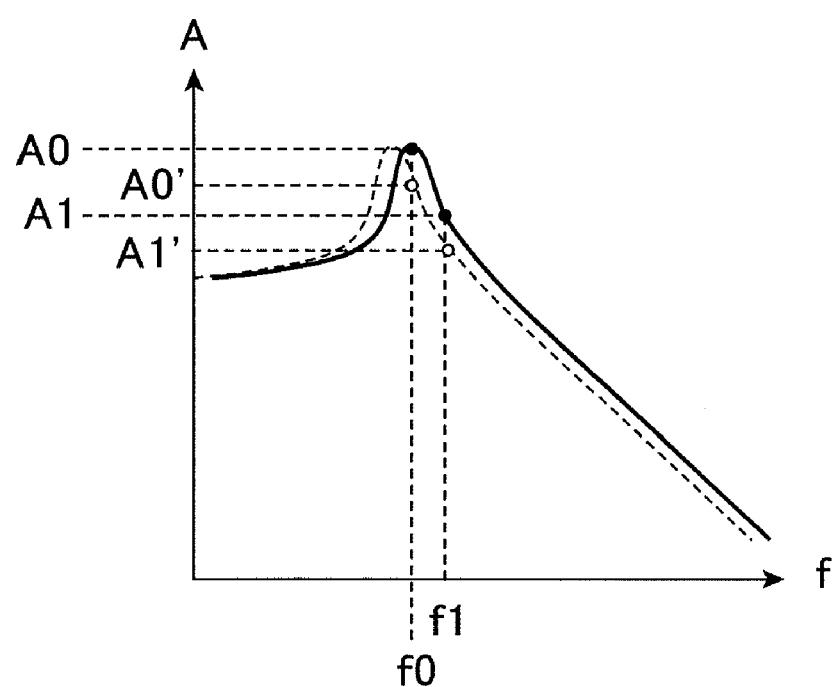
FIG. 6B shows a graph of the scan amplitude-to-scan frequency characteristic when the resonance frequency of the scan mirror is changed to a low frequency side.

FIGS. 6A and 6B each illustrate a scan amplitude-to-scan frequency characteristic of the scan mirror 3 in the case where the resonance frequency varies. Specifically, FIG. 6A illustrates a scan amplitude-to-scan frequency characteristic of the scan mirror 3 in the case where the resonance frequency is raised whereas FIG. 6B illustrates a scan amplitude-to-scan frequency characteristics of the scan mirror 3 in the case where the resonance frequency is lowered.

As shown in FIG. 6A, when the resonance frequency of the scan mirror 3 is raised from f0 to f0', the scan amplitude-to-scan frequency characteristic is changed from a solid line to a broken line. In this case, the relation between the scan frequency and the scan amplitude, which satisfies the relation of A0>A1 with respect to the relation of f0<f1, is changed. More specifically, the original relationship is not holds, i.e., when the frequency is modulated so as to be gradually changed from f0 to f1, the scan amplitude is raised from A0' to A0 once, and then is lowered from A0 to A1'. As a result, the original relation that the scan frequency is gradually raised whereas the scan amplitude is gradually decreased. In this case, it is not possible to control the scan region in the trapezoid shape shown in FIG. 5.

As shown in FIG. 6B, on the other hand, when the resonance frequency of the scan mirror 3 is lowered, the scan amplitude-to-scan frequency characteristic is changed from a solid line to a broken line; however, this case is different from that shown in FIG. 6A. Specifically, when the frequency is modulated so as to be gradually changed from f0 to f1, the scan amplitude before the resonance frequency is lowered (shown by the solid line) is decreased gradually from A0 to A1 (A0>A1). Likewise, the scan amplitude after the resonance frequency is lowered (shown by the broken line) is also decreased gradually from A0' to A1' (A0'>A1'). As described above, even when the resonance frequency of the scan mirror 3 is lowered, the relations of A0>A1 and A0'>A1' with respect to the relation of f0<f1 are maintained. (That is, the relation that the scan frequency is gradually raised whereas the scan amplitude is decreased gradually is maintained.) Therefore, it is possible to control the scan region in the trapezoid shape. Moreover, when the resonance frequency is lowered, the scan amplitude is decreased as a whole from A1 to A0 or A1' to A0'. Such overall decrease in scan amplitude can be corrected in such a manner that a drive voltage (a voltage of a fast scan drive waveform signal) is raised.

Herein, the fast scan frequency for driving the scan mirror 3 in the fast scan direction is changed in synchronization with the period of the slow scan frequency, and therefore has a predetermined bandwidth (the range of f0 to f1 in the case described above). The lowest frequency in this bandwidth will be referred to as a "fundamental frequency".

Accordingly, when the fundamental frequency for frequency modulation is set to the point in time when the resonance frequency is at the maximum, the resonance frequency never exceeds this maximum resonance frequency. It is therefore possible to hold the following relation that the scan frequency is gradually raised whereas the scan amplitude is gradually lowered. This structure exerts no adverse effect on the control of the scan amplitude.

When the resonance frequency is raised at maximum, the temperature of the vibration system in the scan mirror 3 is lowered at maximum. Accordingly, it is advisable that the resonance frequency at the lowest temperature in a use temperature range (an operating temperature range) is set as the fundamental frequency for frequency modulation.

Further, the temperature of the vibration system in the scan mirror 3 varies depending on a power of the laser beam to be emitted to the scan mirror 3. The scan mirror 3 has a mirror section, and a reflection film made of aluminum is typically formed on a surface of the mirror section. The reflectivity of aluminum takes a value of 80% to 90% in accordance with a wavelength of the laser beam, and the remaining value of 10% to 20% is absorbed and converted into heat. This heat raises the temperature at the mirror section and the temperature at the support section provided around the mirror section. The power of the laser beam to be emitted to the scan mirror 3 is determined based on the brightness of the image to be displayed. This power is maximized when an image to be displayed is in full white and is zero when an image to be displayed is in full black. In the case where an image to be displayed is in full black, accordingly, the temperature of the vibration system in the scan mirror 3 is lowered at maximum, so that the resonance frequency of the scan mirror 3 is raised at maximum.

In view of the foregoing description, it is advisable that the resonance frequency in the case where the image to be displayed is in full black is set as the fundamental frequency at the lowest use temperature in order to control the scan amplitude by the modulation of the fast scan frequency. Thus, it is possible to control the scan amplitude under stable conditions even in the case where the resonance frequency varies because of the change of the ambient temperature and the change of the temperature of the vibration system in the scan mirror 3 caused by the power of the laser beam to be emitted.

As described above, the resonance frequency of the scan mirror 3 varies depending on two conditions, that is, (1) a use environment temperature and (2) a power of a laser beam according to a brightness of an image. Therefore, when the change in resonance frequency is estimated based on the respective conditions, the fundamental frequency for fast scan drive can be changed.

In the case where the scanning image display apparatus is used around a normal temperature, the condition (2), that is, the power of the laser beam according to the brightness of the image rather than the condition (1), that is, the use environment temperature exerts a significant effect on the temperature of the vibration system in the scan mirror 3, and largely contributes to the change of the resonance frequency. However, when the scanning image display apparatus is installed in a vehicle as will be described later, a use environment temperature in the vehicle becomes considerably high, so that the condition (1), that is, the use environment temperature greatly affects the change in the resonance frequency.

Herein, a temperature sensor may be provided for detecting the use environment temperature, and the control section may change the fundamental frequency for fast scan drive, based on a result of detection by the temperature sensor. Alternatively, the control section may change the fundamental frequency for fast scan drive, based on the condition (2), that is, the power of the laser beam according to the brightness of the image. For example, the control section can change the fundamental frequency, based on an average brightness of an image calculated every predetermined time.

The temperature of the vibration system (in particular, the support section 42) in the scan mirror 3 is detected directly and the spring constant K calculated from Equation (9) is corrected based on the detected temperature, so that the resonance frequency on which both the conditions (1) and (2) are reflected can be calculated. Herein, a temperature sensor may be provided for directly detecting the temperature of the vibration system in the scan mirror 3, and the control section may change the fundamental frequency for fast scan drive, based on a result of detection by the temperature sensor.

The fundamental frequency for fast scan drive is changed in accordance with the condition (1) and/or the condition (2), so that the fundamental frequency is corrected so as to be approximate to the resonance frequency even in the case where the resonance frequency is changed. As a result, it is possible to drive the scan mirror 3 in a constant efficient manner and to achieve size reduction of the scan mirror 3 and low power consumption.

As described above, in the case where the projection plane is formed so as to be inclined with respect to the scan center axis in the image display apparatus having the biaxial scan mirror, the fast scan frequency of the scan mirror is modulated appropriately. Thus, it is possible to suppress the trapezoid distortion corresponding to the shape of the scan region and, simultaneously, to suppress the widening of the scan pitch. As a result, it is possible to realize favorable image display with reduced invalid region and with less deteriorated resolution.

Moreover, even when the resonance frequency varies because of the change of the ambient temperature and the change of the temperature of the vibration system caused by the power of the laser beam to be emitted, the scan amplitude can be controlled under stable conditions.

Figure 8B:
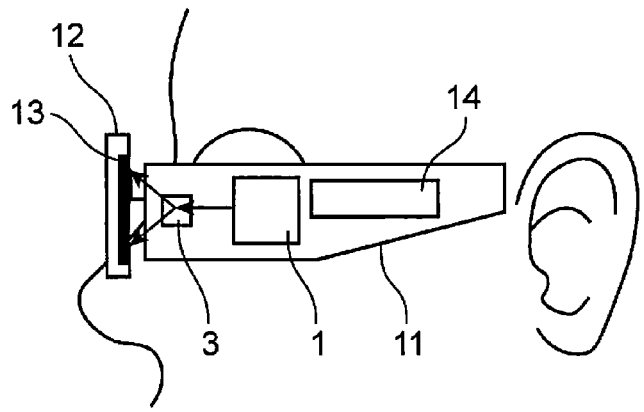
FIG. 8B shows a side view of the main sections in the scanning image display apparatus shown in FIG. 8A.
Figure 8C:
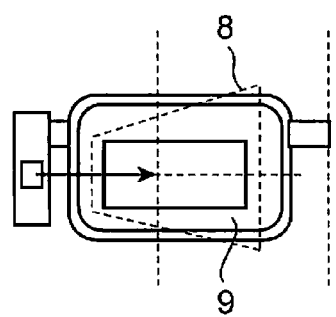
FIG. 8C shows a front view of the main sections in the scanning image display apparatus shown in FIG. 8A when the scanning image display apparatus is seen from an eye side.

With this structure, it is possible to realize the eyewear type image display apparatus (i.e., an HMD) shown in FIGS. 8A and 8B.

The scanning image display apparatus 11 according to the present embodiment is applicable to not only the eyewear type image display apparatus, but also various scanning image display apparatuses such as an in-vehicle scanning image display apparatus, a stationary type projector and a portable type projector. The in-vehicle scanning image display apparatus will be described herein below.

Second Embodiment

Next, an embodiment in which the scanning image display apparatus according to the present invention is installed in a vehicle will be described.

Figure 7:
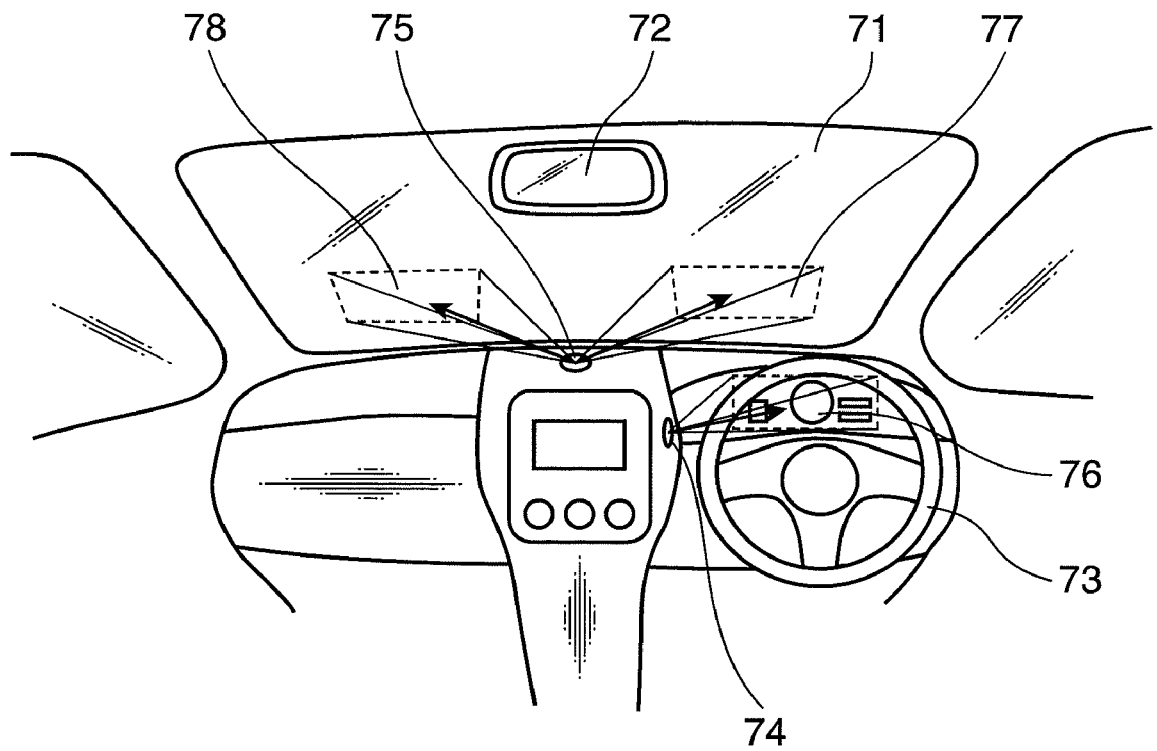
FIG. 7 illustrates a schematic layout of an in-vehicle scanning image display apparatus according to another embodiment of the present invention.

FIG. 7 schematically illustrates installation of the in-vehicle scanning image display apparatus according to the present embodiment. FIG. 7 shows a driving seat in an automobile seen from a rear side, and a windshield 71, a rearview mirror 72, a steering wheel 73 and the like are provided inside the automobile. In the in-vehicle scanning image display apparatus, an instrument panel section display 76 is projected from a projection opening 74 provided on a center of a dashboard onto a display region (a projection plane) formed on a rear side of the steering wheel 73. A speedometer, various indicators and the like are displayed as the instrument panel section display 76.

In the in-vehicle scanning image display apparatus, moreover, a driving seat section display 77 and a passenger seat section display 78 are projected from a projection opening 75 onto the windshield 71 (the projection plane). That is, the in-vehicle scanning image display apparatus is a so-called head-up display. Examples of the driving seat section display 77 and the passenger seat section display 78 to be projected onto the windshield 7 may include a speed display, a night vision image, a display of warning about collision with a pedestrian or an obstacle, navigation information, and the like.

The in-vehicle scanning image display apparatus has a structure equal to that described in the first embodiment. Therefore, it is possible to suppress a trapezoid distortion in a scan region and, simultaneously, to suppress widening of a scan pitch even in a case of oblique projection with respect to a projection plane. Thus, it is possible to install a small scanning image display apparatus in a limited space around a driving seat, and to display characters, signs and the like at various positions.

In the foregoing embodiments, the oblique arrangement relation between the scan mirror and the projection plane is fixed. Likewise, this structure is also applicable to a typical projector in which a display is projected onto an external screen at a given angle.

In the case where the scan mirror and the projection plane are arranged fixedly, the angle $\alpha$ of the laser beam entering the projection plane is determined in advance. Therefore, the modulation degree according to the incident angle $\alpha$ (the amount of change of the fast scan frequency from the fundamental frequency) can be set upon manufacture or installation of a product.

On the other hand, in the case where the relative position between the scan mirror and the projection plane is not fixed, a setting section that allows a user to optionally set a modulation degree may be provided such that the user can adjust an amount of correction in accordance with a degree of correction of a trapezoid shape in a scan region. Alternatively, a sensor section capable of recognizing a positional relation between a scan mirror and a projection plane may be provided such that a control section can automatically set a modulation degree. For example, an imaging sensor such as a CCD (Charge Coupled Device) image sensor captures an image of a projection plane to recognize a trapezoid distortion in a scan region, and a control section automatically adjusts a modulation degree so as to correct the trapezoid distortion.

For a normal projector, wherein a projection plane is formed vertically without fail, an amount of correction can be estimated by detection of a gradient of a scanning image display apparatus itself. Therefore, a modulation degree can be automatically set in accordance with the amount of correction.

In the foregoing embodiments, the scanning image display apparatus employs the biaxial scan mirror that singly performs a two-dimensional scan operation. Alternatively, the scanning image display apparatus may employ two monoaxial scan mirrors. In the foregoing embodiments, more specifically, the biaxial resonant MEMS mirror that allows a biaxial scan operation in one chip is described with reference to FIG. 4. Alternatively, a monoaxial scan MEMS mirror may be used for each of the drive operation in the fast scan direction and the drive operation in the slow scan direction. Moreover, a galvanometer mirror may be employed for drive operation in the slow scan direction. That is, the scanning image display apparatus according to the present embodiment has a feature in that the scan amplitude is controlled by the change of the fast scan frequency of the scan mirror, and various mirrors may be employed as the scan mirror.

As described above, a scanning image display apparatus according to one aspect of the present invention includes a light source section that emits a laser beam, a scan mirror that scans the laser beam two-dimensionally in a first direction and a second direction which intersects the first direction, and a control section that drives the scan mirror, wherein the control section drives the scan mirror such that a scan frequency in the first direction becomes higher than a scan frequency in the second direction, and changes the scan frequency in the first direction in synchronization with a period of the scan frequency in the second direction to change a scan amplitude in the first direction.

With this structure, an image to be displayed is formed in such a manner that the scan mirror scans the laser beam two-dimensionally. Herein, the operation of scanning the laser beam in the first direction is performed at a higher frequency than the operation of scanning the laser beam in the second direction. (In other words, the first direction corresponds to a fast scan direction and the second direction corresponds to a slow scan direction.) The scan mirror has the following scan amplitude-to-scan frequency characteristic. That is, when the scan mirror is driven at a resonance frequency in the first direction, the scan amplitude in the first direction is increased at maximum, and this scan amplitude is decreased as the frequency deviates from the resonance frequency. Based on the scan amplitude-to-scan frequency characteristic, it is possible to change the scan frequency in the first direction and thereby to change the scan amplitude in the first direction. Herein, the control section that drives the scan mirror changes the scan frequency in the first direction in synchronization with the period of the scan frequency in the second direction to change the scan amplitude in the first direction. Conventionally, a drive voltage for a scan mirror is changed in order to adjust a scan amplitude. According to the present invention, on the other hand, a scan frequency is changed in order to adjust a scan amplitude. Therefore, the present invention is quite different from the conventional technique in a structure of adjusting a scan amplitude. According to the present invention, it is possible to adjust a scan amplitude under stable conditions as compared with the conventional technique even when the scan frequency in the second direction is relatively high, and to set a scan region to a shape as desired. Thus, it is possible to display a high-quality image even in a case of oblique display.

Preferably, the control section gradually raises the scan frequency in the first direction from a fundamental frequency at a former half of the period of the scan frequency in the second direction, and gradually lowers the scan frequency in the first direction to return the scan frequency to the fundamental frequency at a latter half of the period of the scan frequency in the second direction.

With this structure, in the case of changing the scan frequency in the first direction in synchronization with the period of the scan frequency in the second direction, the scan frequency in the first direction is gradually raised at the former half of the period of the scan frequency in the second direction, and is gradually lowered at the latter half of the period of the scan frequency in the second direction. Thus, it is possible to smoothly adjust the scan amplitude in the first direction in synchronization with the period of the scan frequency in the second direction.

In the structure described above, preferably, when the laser beam scanned by the scan mirror is obliquely projected onto a projection plane, the second direction is set to a direction that a projection distance from the scan mirror to the projection plane is changed. Moreover, the control section gradually raises the scan frequency in the first direction from the fundamental frequency when the projection distance is increased gradually by the scan operation in the second direction, and gradually lowers the scan frequency in the first direction to return the scan frequency to the fundamental frequency when the projection distance is decreased gradually by the scan operation in the second direction.

With this structure, in the case where the laser beam is obliquely projected onto the projection plane, when the projection distance is increased gradually by the scan operation in the second direction, the scan frequency in the first direction is gradually raised. On the other hand, when the projection distance is decreased gradually, the scan frequency in the first direction is gradually lowered. Thus, it is possible to correct a trapezoid distortion in the scan region on the projection plane and thereby to set the scan region at a rectangular shape. Further, the scan frequency in the first direction is gradually raised as the projection distance in the second direction is increased gradually. Therefore, it is possible to suppress widening of a scan pitch in the scan region, and to realize even resolution in the scan region.

Preferably, the fundamental frequency in the first direction is set to a resonance frequency of the scan mirror in the first direction in a case where an image to be displayed is in full black.

In this structure, the case where the image to be displayed is in full black corresponds to a case where a brightness of the entire image to be displayed is zero, that is, a case where a power of the laser beam is zero. In this case, a temperature of a vibration system in the scan mirror becomes lower as compared with a different case, so that the resonance frequency of the scan mirror in the first direction is raised at maximum. Accordingly, the fundamental frequency in the first direction is set to the resonance frequency in the first direction in the case where the image to be displayed is in full black, so that the scan amplitude in the first direction is decreased gradually as the scan frequency in the first direction is gradually raised even when the resonance frequency in the first direction is changed in the case different from the case where the image to be displayed is in full black. This structure exerts no adverse effect on the control for the scan amplitude in the first direction.

In the structure described above, preferably, the fundamental frequency in the first direction is set to a resonance frequency of the scan mirror in the first direction when a temperature is at a lowest temperature within an operating temperature range.

With this structure, in the case where the temperature is lowest within the operating temperature range, the temperature of the vibration system in the scan mirror becomes lower than the remaining operating temperature. Thus, the resonance frequency of the scan mirror in the first direction is raised at maximum. Accordingly, the fundamental frequency in the first direction is set to the resonance frequency in the first direction in the case where the temperature is lowest within the operating temperature range, so that the scan amplitude in the first direction is decreased gradually as the scan frequency in the first direction is gradually raised even when the resonance frequency in the first direction is changed because the operating temperature is changed within the operating temperature range. This structure exerts no adverse effect on the control for the scan amplitude in the first direction.

Preferably, the scan mirror is a biaxial resonance mirror, and the fundamental frequency in the first direction is set to a frequency around the resonance frequency of the scan mirror in the first direction.

According to the foregoing structure, the scan mirror can be efficiently driven while being resonated on the condition around the resonance frequency in the first direction. Therefore, it is possible to reduce a size of the scan mirror, and to suppress power consumption.

With the foregoing structure, it is preferable that the control section adjusts the scan amplitude in the first direction and a scan pitch in the second direction by changing the scan frequency in the first direction, while adjusting a scan pitch in the first direction by changing a drive voltage for the scan mirror.

According to the foregoing structure, with a combination of the control for changing the scan frequency in the first direction with the control for changing the drive voltage for the scan mirror, it is possible to improve a degree of freedom regarding the correction of the trapezoid distortion in the scan region occurring in the case of oblique projection, and also to improve a degree of freedom regarding the correction of the scan pitch in the second direction. Thus, it is possible to display a higher-quality image even in the case of oblique projection.

With the foregoing structure, it is preferable that the scanning image display apparatus further includes a focus control section that controls a focus of the laser beam such that a beam spot diameter of the laser beam on the projection plane increases as a scan region on the projection plane has a wider scan pitch in the second direction.

According to the foregoing structure, it is possible to produce an effect of suppressing such a disadvantage that scan lines overlap excessively over an entire screen to be displayed on the projection plane and a pitch between the scan lines becomes widened excessively.

With the foregoing structure, it is preferable that the scanning image display apparatus further includes a beam intensity control section that controls the light source section to a lower intensity of the laser beam for a larger beam spot diameter of the laser beam on the projection plane According to the foregoing structure, it is possible to suppress uneven brightness over an entire screen to be displayed on the projection plane.

With the foregoing structure, it is preferable that a modulation degree setting section that sets an amount of change in the scan frequency in the first direction from the fundamental frequency.

According to the foregoing structure, even in the case where the relative position between the scan mirror and the projection plane is not fixed, the modulation degree setting section adjusts the amount of change from the fundamental frequency in accordance with the relative position between them. Therefore, it is possible to appropriately correct a trapezoid distortion in the scan region.

With the foregoing structure, it is preferable that the scanning image display apparatus further includes an eyewear lens, and a hologram mirror that is formed on a surface of the eyewear lens to serve as the projection plane.

According to the foregoing structure, it is possible to realize a scanning image display apparatus of an eyewear type capable of displaying a high-quality image.

The specific embodiments or examples in the detailed description of the invention are merely for clarifying the technical content of the present invention, and the present invention should not be interpreted within these limited examples, but can be modified in various ways within the spirit of the present invention and scope of the claims described herein below.

INDUSTRIAL APPLICABILITY

The scanning image display apparatus according to the present invention can appropriately set a shape of a scan pattern, and therefore can be applied to uses as an image display apparatus such as an eyewear type HMD, a display system, and the like.

The invention claimed is:

1. A scanning image display apparatus comprising:
   a light source section that emits a laser beam;
   a scan mirror that scans the laser beam two-dimensionally in a first direction and a second direction which intersects the first direction; and
   a control section that drives the scan mirror,
   wherein the control section drives the scan mirror such that a scan frequency in the first direction becomes higher than a scan frequency in the second direction, and changes the scan frequency in the first direction in synchronization with a period of the scan frequency in the second direction to change a scan amplitude in the first direction,
   wherein when the laser beam scanned by the scan mirror is obliquely projected onto a projection plane, the second direction is set to a direction that a projection distance from the scan mirror to the projection plane is changed, and
   wherein the control section gradually raises the scan frequency in the first direction from the fundamental frequency when the projection distance is increased gradually by the scan operation in the second direction, and gradually lowers the scan frequency in the first direction to return the scan frequency to the fundamental frequency when the projection distance is decreased gradually by the scan operation in the second direction.

2. The scanning image display apparatus according to claim 1, further comprising:
   a focus control section that controls a focus of the laser beam such that a beam spot diameter of the laser beam on the projection plane increases as a scan region on the projection plane has a wider scan pitch in the second direction.

3. The scanning image display apparatus according to claim 2, further comprising:
   a beam intensity control section that controls the light source section to emit a lower intensity of the laser beam for a larger beam spot diameter of the laser beam on the projection plane.

4. The scanning image display apparatus according to claim 1, further comprising:
   an eyewear lens; and
   a hologram mirror that is formed on a surface of the eyewear lens to serve as the projection plane.

* * * * *